United States Patent Office 3,449,733
Patented June 10, 1969

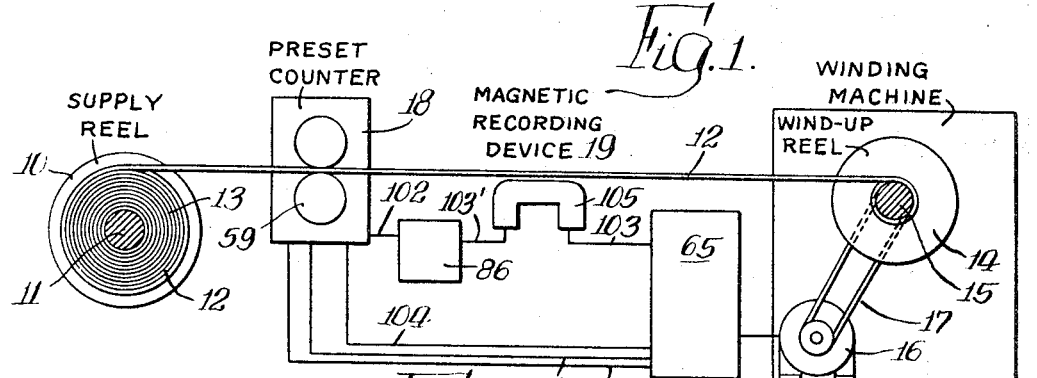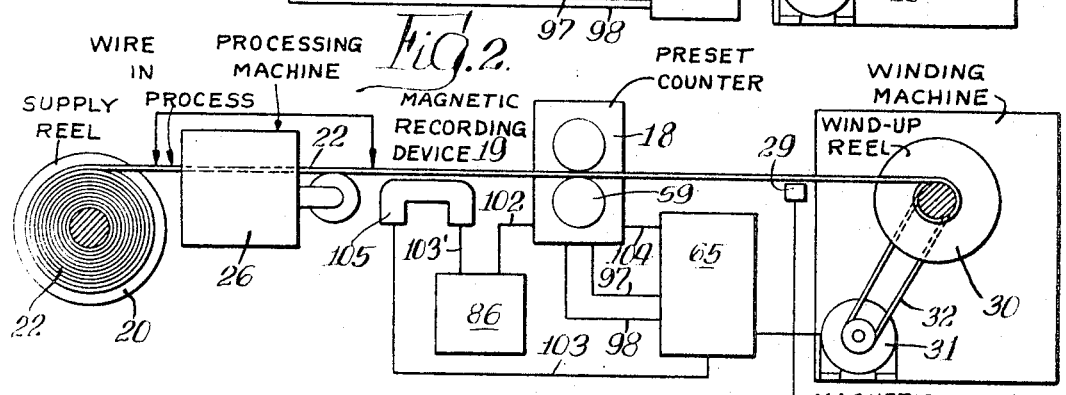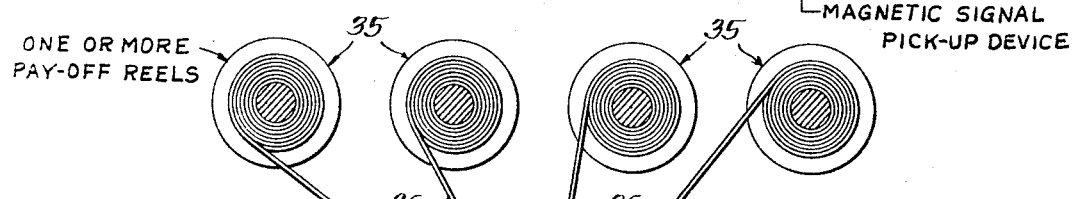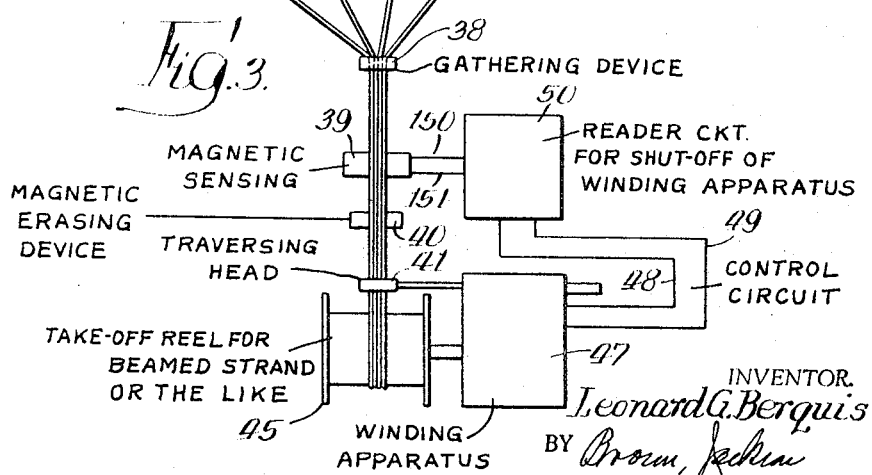

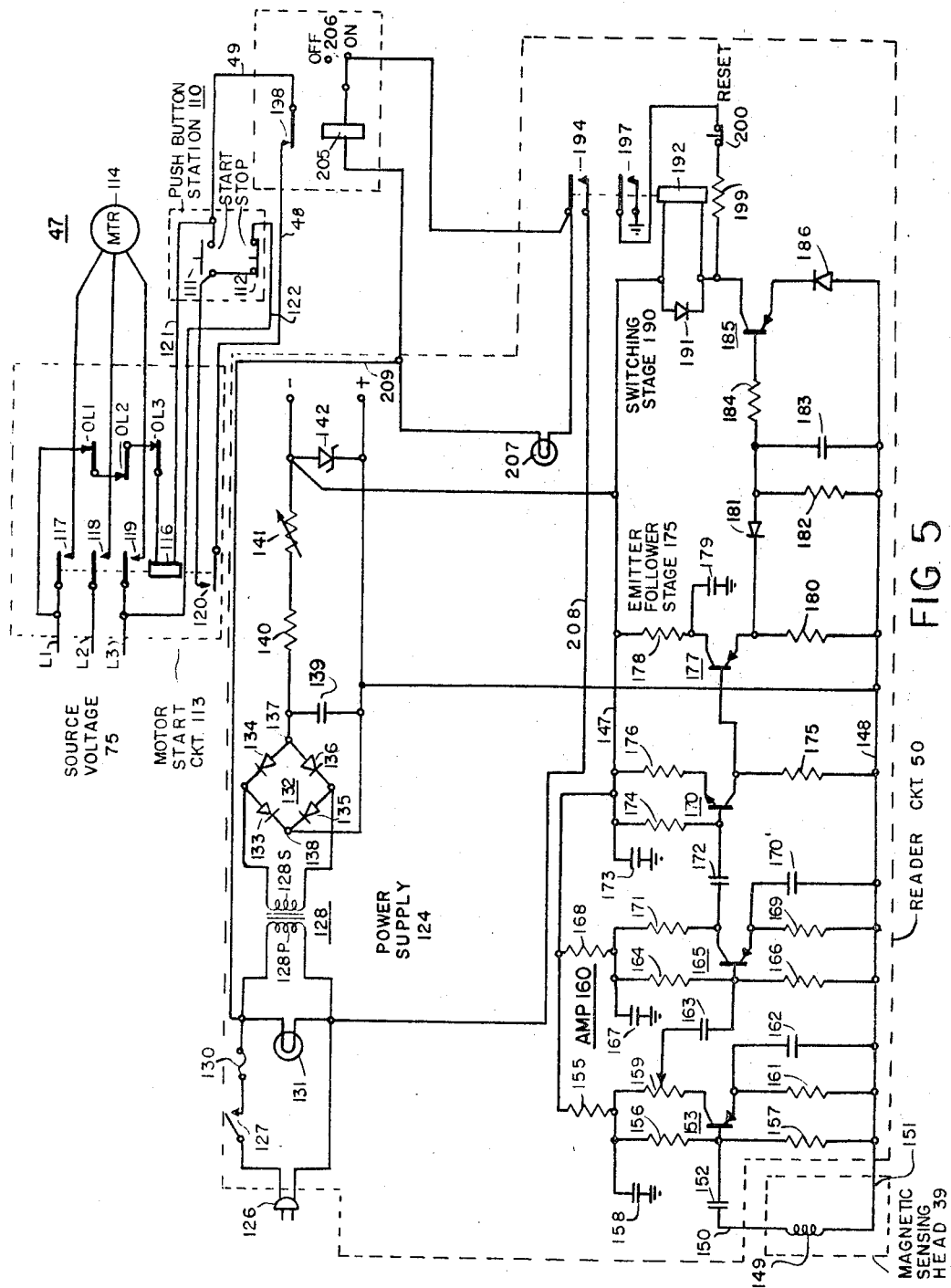

3,449,733
METHODS AND APPARATUS FOR USE IN THE INDUSTRIAL MAGNETIC MATERIALS ART
Leonard G. Berquist, Niles, Mich., assignor to National-Standard Company, Niles, Mich., a corporation of Delaware
Filed Apr. 1, 1964, Ser. No. 356,591
Int. Cl. G11b 5/04, 5/74; B65h 25/00
U.S. Cl. 340—174.1                                    8 Claims

ABSTRACT OF THE DISCLOSURE

Recording and sensing means in which a signal is applied on a predetermined portion of an elongated member during movement of that member in one direction of and along its axis, and sensing of said signal upon movement of such elongated member in the other direction of and along its axis.

---

The present invention relates to the art of magnetic materials such as magnetizable wire, rod, tape and the like.

In many fabricating or winding operations dealing with magnetic materials, the materials are caused to be fed or moved in a direction along their length, such, for example, as wire being drawn off a coil by a machine at which a desired end or intermediate operation is to be performed with or to the wire. It is desirable in many circumstances that such a machine operate continuously or a signal be given to the operator or attendant that the supply coil is coming to an end so that before the trailing end of the supply coil leaves the supply source or reaches the machine, the machine may be stopped or the supply wire replenished to permit the machine to continue to operate. Thus, in continuous operation of such a machine the operator may be alerted when a supply coil is nearing exhaustion so that the operator may connect the leading end of another supply coil to the trailing end of the exhausting coil to permit the machine to continue to operate without interruption. In other circumstances, it is desirable to de-energize the machine as a supply coil nears depletion.

Further in the art to which the present invention relates, it is highly desirable, for example, for inventory purposes that some means be provided for the ready identification and/or length of supplies of elongated magnetizable materials such as rods, or coils of magnetic tape or wire.

It is an object of the present invention to provide a method and apparatus for use in the above referred to industrial art of magnetic materials in which a predetermined lengthwise portion of elongated magnetizable material has a magnetic recording of predetermined intelligence impressed thereon for a given machine function, and which recording may be subsequently magnetically sensed to effect the given machine function of the recorded magnetic intelligence on the predetermined portion of the length of the material.

It will be readily recognized from the above object that such predetermined recorded intelligence may be such as to inform an operator of a machine being fed from a supply coil of wire that the supply coil is soon to exhaust, or effect automatic shut-off of the machine before exhaustion of the supply coil, or that such recorded intelligence may be read to identify the composition of the material and the length of such material in a supply source thereof.

A further object of the invention resides in providing a method and apparatus in which predetermined intelligence is magnetically recorded on a predetermined portion of the length of elongated magnetizable material by relative movement of the material in one direction of its length relative to a magnetic recording device, and thereafter effect relative movement of the material in the opposite direction of its length with respect to a magnetic sensing device responsive to the intelligence recorded on such predetermined lengthwise portion of the material.

A further object of the invention is to provide a method and apparatus in which a pay-off coil of magnetizable wire is provided with a pre-recorded magnetic signal at a predetermined lengthwise portion at the inner terminal end thereof, and in which upon unwinding of the coil and movement of the wire relative to a magnetic sensing device sensitive to the magnetic signal on said wire, the magnetic sensing device issues a signal upon passing thereby of said predetermined lengthwise portion of the wire.

A further object is to provide a method and apparatus as last aforesaid in which a plurality of pay-off coils, as aforesaid, are provided, in which the wires from said pay-off coils are withdrawn onto a take-off coil, and in which the several wires in passing from the pay-off coils to the take-off coils pass a magnetic sensing device sensitive to the magnetic signals on the predetermined lengthwise portions thereof so that the magnetic sensing device issues a signal upon the passing thereby of the predetermined lengthwise portions of the wires of the pay-off coils.

A further object is to provide a method and apparatus as last aforesaid in which the magnetic sensing device terminates movement of the wires of the pay-off coils to the take-off coil upon the passing thereby of any of the predetermined lengthwise portions of the wires of the pay-off coils.

Another object of the invention is to provide a method and apparatus as aforesaid in which the wire of a supply coil or coils has the recorded magnetic signal thereon deleted after such recorded magnetic signal has served its aforesaid purpose.

The above and other objects and advantages of the invention will appear from the following detailed description of certain preferred embodiments of the invention.

Now in order to acquaint those skilled in the art with the principles of the present invention certain preferred embodiments of the invention will be described below in connection with the accompanying drawings.

In the drawings:

FIGURE 1 is a schematic side elevational view of one form of apparatus constructed in accordance with the principles of the present invention;

FIGURE 2 is a schematic side elevational view of another form of apparatus constructed in accordance with the principles of the present invention;

FIGURE 3 is a schematic plan view of still another form of apparatus constructed in accordance with the principles of the present invention.

FIGURE 5 is a detailed illustration of the circuitry in one embodiment of a reader device for automatically stopping a winding apparatus responsive to detection of a recorded signal on a wire.

Figure 4:
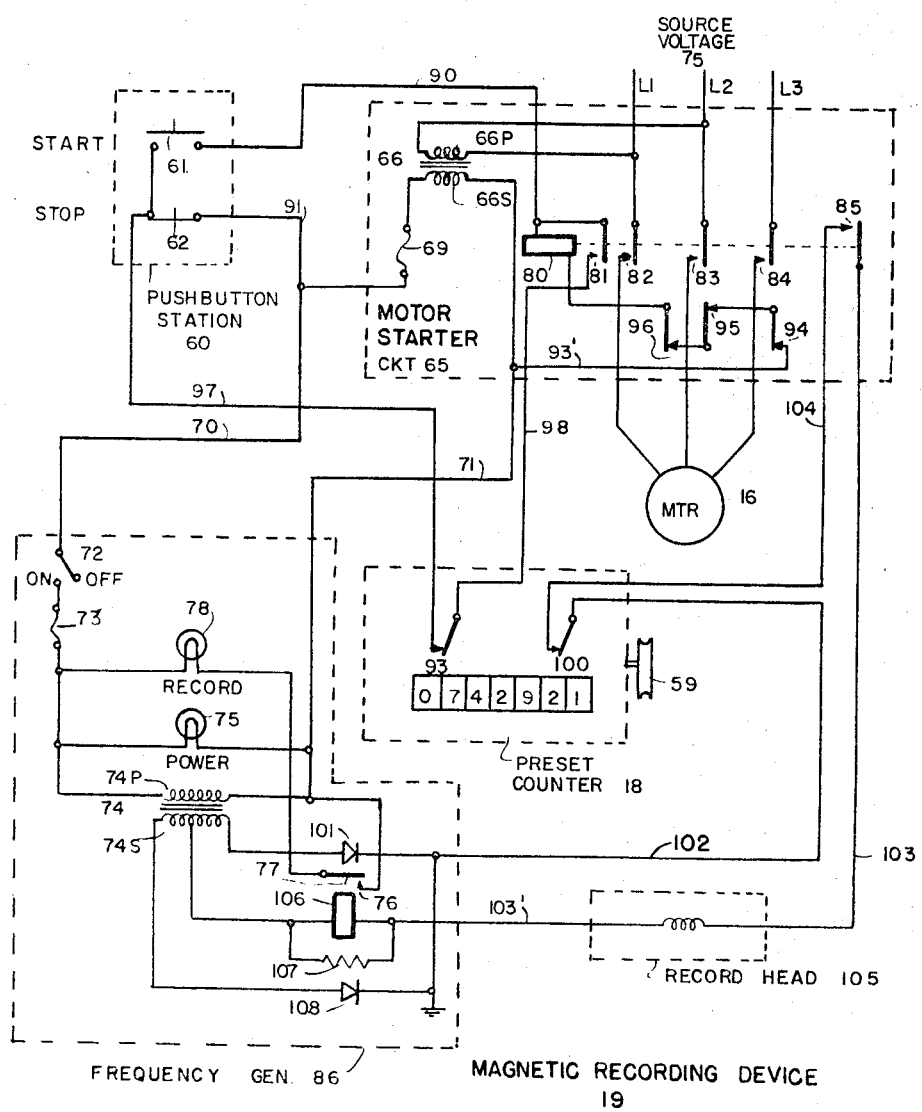
FIGURE 4 is a detailed illustration of the circuitry used in the automatic recording of a signal on a predetermined length of wire in one embodiment of the invention.

Referring now to FIGURE 1 of the drawings, there is shown a schematic arrangement of components of an apparatus constructed in accordance with the present invention. The apparatus shown comprises a supply reel 10 which is suitably mounted for rotation in known manner for rotation on a shaft indicated at 11. The leading end portion of the wire 12 of a supply coil 13 carried by supply reel 10 is wound a few turns around and in an amount sufficient to affix it to the hub of a wind-up reel 14, which is mounted for rotation on and with a shaft 15. The leading end portion of the wire may of course be fastened to the wind-up reel as by tacking with pressure sensitive tape or otherwise, as may be desired. A motor starter circuit 65 may be provided to control a conventional electric motor 16 in the drive of the wind-up reel 14 in a clockwise direction as viewed in the drawing through a drive belt 17. The wire 12 from the supply reel as shown passes over the counter pulley 59 of a known counter device 18, which may be adjustably set to measure a given length of wire, and above the reocrding head 105 of a magnetic recording device 19 hereinafter described in detail. Upon energization of the motor starter circuit 65, motor 16 rotates the wind-up reel 14 as aforesaid in a clockwise direction to draw the wire of the supply coil 13 off of the supply reel 10 for winding on to the wind-up reel to form a wind-up coil. Upon such rotation of the wind-up reel 14, the counter 18 measures a desired predetermined lengthwise portion of the wire adjacent the leading end of the wire 12 in its movement from the supply coil, and for such measured length is effective with motor starter circuit 65 to effect energization of the recording head 105 by a frequency generator 86, the circuit for the recording head extending from the frequency generator 86 over conductor 102, preset counter 18, conductor 104, motor starter circuit 65, conductor 103, recording head 105, conductor 103' to the frequency generator circuit 86. During the period of energization by such circuit, recording head 105 applies a magnetic signal to the wire length which passes thereover. After such predetermined length of wire, as measured by the preset counter 18, has passed the magnetic recording device 19, preset counter 18 interrupts such circuit for the magnetic recording head 105, and winding of the coil of wire 12 onto the windup reel 14 is completed with the following lengthwise portion of the wire being free of a magnetic signal.

As a total preselected length of wire 12 is wound onto the winding reel 14, preset counter 18 interrupts a control circuit which extends over conductors 97, 98 to motor starter circuit 65 to terminate the winding operation by motor 16.

In the apparatus of FIGURE 1 a wind-up coil of a preselected length of wire is thus formed in which the inner lead portion at the inner turns of the coil sufficient to attach the wire to the hub or wind-up reel 14 is free of a magnetic signal, followed by a predetermined lengthwise portion on which a magnetic signal is impressed, and which predetermined lengthwise portion of the wire in turn is followed by the remaining portion wire of the supply coil which is free of a magnetic signal.

The function and purpose of a coil of wire thus formed will be described hereinafter.

Now referring to FIGURE 2 there is shown another typical form of apparatus of the present invention in which a supply reel 20 supports a supply coil of wire 22. The wire 22 first passes from the supply coil through a processing machine or apparatus 26 at which the wire may be coated or otherwise processed with respect to the end desired use of the wire in a subsequent operation. The wire 22 then passes over the recording head 105 of a magnetic recording device 19, hereinafter described in detail, through a preset counter 18, over a magnetic signal pick-up device 29 and then to a wind-up reel 30 on which the wire is formed into a wind-up coil. The wind-up reel 30 may be rotated in any suitable manner in a clockwise direction as viewed in the drawing, as by means of an electric motor 31 and a drive belt 32 extending between the motor and the wind-up reel 30. In the form of apparatus last described, the leading terminal end portion of the wire 22 form the supply reel is again preferably wrapped around the hub of the wind-up reel to anchor it to the reel, or otherwise secured to the wind-up reel, so that rotation of the wind-up reel draws the wire from the supply reel through the processing machine traversing the recording head 105 through the preset counter 18, over or across the magnetic pick-up device 29, and on to the wind-up reel 30. In the apparatus shown the preset counter 18 is set to provide for energization of the magnetic recording head 105 to impress a magnetic signal on a predetermined poriton of the length of wire adjacent the leading terminal portion so that the wind-up coil on the wind-up reel again includes a lead portion that is free of a magnetic signal followed by a predetermined lengthwise portion upon which a signal has been impressed by the recording head 105, and with the remainder of the wire from the supply coil to the wind-up coil being free of a magnetic signal.

The circuit for energizing recording head 105 in such manner of recording extends from a frequency generator 86 in magnetic recording circuit 19 over conductor 103', recording head 105, conductor 103, motor starter circuit 65, conductor 104, preset counter 18 and conductor 102 to the frequency generator 86.

When the total length of wire desired has been wound on windup reel 30, preset counter 18 is further effective over conductors 97, 98 to control motor starter circuit 65 to terminate the drive of the reel 30 by motor 31.

The wind-up reels of wire as thus formed by the methods and apparatus of FIGURES 1 and 2 may serve as pay-off reels for the wind-up coils thereon as indicated at 35 in FIGURE 3 of the drawings. As shown in this figure, outer terminal lead portions of the wires 36 from the pay-off reels 35 are passed through a known gatherig device 38, over a magnetic sensing device 39, a magnetic signal erasing device 40, through a traversing head 41 and onto a take-off reel 45. The apparatus of FIGURE 3 except for the foregoing magnetic components is conventionally referred to in the art as a beamer and the take-off reel 45 has strand coiled thereon which in the specific embodiment shown is composed of four wires, one from each of the four pay-off reels.

A power driven winding apparatus 47 is suitably connected with the take-off reel 45 for rotating the same. Automatic control of the winding apparatus 47 is effected over conductors 48, 49 by a reader control circuit 50 which is in turn connected over conductors 150, 151 to a sensing head 39. The wires 36 of the several pay-off reels 35 are threaded through the apparatus as aforesaid and lead portions thereof are wound about the take-off reel or otherwise secured thereto so that upon energization of the winding apparatus 47, the take-off reel is rotated to draw the wires 36 through the apparatus from the several pay-off reels 35. When the predetermine magnetized portions adjacent the inner terminal ends of any of the wires 36 traverse the magnetic sensing device 39, the reader circuit 50 is energized to interrupt the energizing circuit for the winding apparatus 47 and thereby stop rotation of the take-off reel. Preferably the magnetic recordings on the wires of the several pay-off coils are predetermined so that as the winding apparatus 47 stops rotation of the take-off reel 45, the inner terminal end portions of the wires of coils of the pay-off coils are not fully withdrawn therefrom. Thus, when any magnetic recorded portion of a wire 36 of a pay-off coil traverses the magnetic sensing device, the rotation of the take-off reel is terminated and a new pay-off coil like coil 35 may have its leading end connected to the trailing end of the nearly exhausted reel after which the operation may again be continued.

It will be understood that the recorded signal at the inner end of the wire of a pay-off coil 35 should be positioned far enough from the inner terminal end of the wire to permit a slow stop of the fastest winding apparatus of a beamer for which the wire coils of the present invention are utilized. Also, it will be readily apparent that in lieu of impressing a magnetic signal on a predetermined lengthwise portion of the wire that such predetermined lengthwise portion may be devoid of a magnetic signal in which case the remaining portion of the wire may have a signal impressed thereon, and in which event the magnetic sensing device would be operative to sense for the absence of a signal to effect de-energization of the winding apparatus 47.

Further in accordance with the present invention the magnetic recording device 19 of the apparatus of FIGURES 1 and 2 may be utilized to impress coded magnetic signals on wire passing thereby for purposes of identifying the composition of the wire and also the counter 18 in both embodiments may be set so that upon the passage of predetermined lengths of the wire passing therethrough a magnetic signal is impressed on the wire which may be subsequently magnetically read so that the number of feet of wire in an end coil may be determined.

For the foregoing it will be seen that our invention comprehends a method for use in the industrial magnetic materials art embodying the steps of effecting relative movement of an elongated magnetizable member, such as wires 13 or 22, in one direction of the length thereof with respect to a magnetic recording device, such as device 19, which are effective to magnetically record predetermined intelligence for a given machine purpose onto the wire at a predetermined lengthwise portion thereof. Thereafter the elongated material with the recorded magnetic intelligence thereon, such as wire 36 from a reel 35, and as a further step in the methods of the invention may be moved in the other direction of its length and relative to a magnetic sensing device, such as the device 39 of FIGURE 3, and which device is sensitive to the magnetic recording on the wire so that the magnetic sensing device is responsive to and effects the given machine function of the recorded intelligence on the wire, such as de-energization of a wind-up apparatus 47. The methods of the present invention further comprehend the step of measuring a predetermined length or lengths of a magnetizable elongated member, as by a measuring device such as shown at 18 of FIGURES 1 and 2 of the drawings, and then impressing a magnetic signal on such predetermined length or lengths of the wire for the purposes already above described. The method of the invention further comprehends the removal of a magnetic signal from a predetermined lengthwise portion of portions of a wind-up or pay-off coil after the magnetic signal has effected its given machine function.

The essential components of apparatus and steps of the methods of the invention are above related but it will be understood that various modifications and variations may be made therein without departing from the spirit and scope of the invention.

Specific description of recorder control circuitry

There is now set forth hereat the specific control circuitry which may be used with the winding apparatus of FIGURES 1 and 2 for example to effect the marking of a predetermined length of a wire, such as 12, 22 (FIGURES 1 and 2) as it is being wound on windup reels, such as 14, 30, and to automatically terminate the winding operation as a desired preselected amount of wire is wound on reels 14, 30.

With specific reference to FIGURES 1 and 4, the control system for effecting such manner of control is shown to basically comprise a motor starter circuit 65 including a push-button station 60 for controlling the energization of a motor 16 which drives the windup reel 14. As a predetermined length of wire is wound on reel 14, contacts 93 on preset counter 18 control motor starter circuit 65 to de-energize motor 16. Alternatively, the attendant may use the push-button station 60 to stop the drive motor 16 at any time.

The control circuitry also includes a magnetic recording device 19 which comprises a frequency generator 86 which is connected to energize a record head 105 as controlled by preset counter 18 and motor starter circuit 65. That is, during the period the predetermined length of wire 12 is passing over counter pulley 59 on preset counter 18, contacts 100 on preset counter and contacts 85 in motor starter circuit 65 are closed to complete an energizing circuit from frequency generator 86 to the record head 105. When the signal has been recorded on the desired predetermined length of wire, contacts 100 on preset counter 18 automatically open the energizing circuit for recording head 105 to terminate the recording operation.

With reference first to the motor control portion of the circuitry, as shown in FIGURE 4, the control circuitry includes a "start" button in push-button station 60 for controlling a pair of normally open contacts 61, and a stop button for controlling a pair of normally closed contacts 62, each of which buttons is spring biased by means (not shown) to the positions indicated in FIGURE 4. As will be shown, closure of start button 61 will control motor starter circuit 65 to effect connection of motor 16 to a conventional three phase, 220 volt alternating current power source 75, and operation of the stop-button to open contacts 62 will control motor starter circuit 65 to interrupt the connection of the motor 16 to source 75.

Motor starter circuit 65, which is controlled by the start-stop contacts 61, 62, basically comprises a motor control relay 80 having a first contact set 81 for completing a self-holding circuit (which is effective after the operator releases. The start button 61 subsequent to momentary depression thereof in starting the motor), a set of motor control contacts 82–84 for connecting the motor 16 to the input power source 75, and a set of recorder control contacts 85 for connecting the magnetic recording device 19 to the frequency generator 86 as the motor is initially energized. A transformer 66 in the motor starter circuit 65 has a primary winding 66P connected across line conductors L1, L2 and a secondary winding 66S for providing a 110 volt alternating current source for the motor starter circuit 65 as well as for the recorder circuit 19.

The recorder circuit 19 basically comprises a frequency generator 86 which is connected over conductors 70, 71 and an associated single pole, single throw switch 72, to the 110 alternating current source in the motor starter circuit 65. An indicator lamp 75 on the frequency generator 86 is energized whenever switch 72 is closed to the power source 66S to thereby indicate to the attendant that the transformer 74 of the frequency generator 86 is energized.

A transformer 74 in the frequency generator circuit 86 is energized with closure of switch 72, and at its secondary winding 74S couples signal current over an energizing circuit for record head 105 and sensing relay 106 which, as desribed more fully hereinafter, is further controlled by the contacts 100 and 85 in the preset counter 18 and the motor start circuit 65 respectively. Sensing relay 106 which is connected in such circuit is operative at its contacts 76, 77 to energize an indicator lamp 78 to inform the attendant of the signal recording condition of the system.

In the use of the system in the embodiment set forth in FIGURE 1, the operator attaches the lead-out end of the wire 12 to the wind-up reel 14 and adjusts a first selection knob (not shown) on the preset counter 18 to select the length of the wire upon which the signal is to be initially recorded by the system, and sets a second selection knob (not shown) on the preset counter 18 to select the total length of wire to be wound on the wind-up reel 14. The attendant also closes power switch 72 to the magnetic recording device 19, and indicator lamp 75 illuminates to indicate the energized condition of the frequency generator 86.

The attendant thereupon momentarily depresses the start button in push-button station 60 to close contacts 61, and thus complete an energizing circuit for motor start relay 80, the circuit specifically extending from the right hand terminal of the transformer secondary winding 66S (the 110 v., 60 cycle source) conductor 93' over series motor overload contacts 94–96, motor control relay 80, conductor 90, start contacts 61, as momentarily depressed by the attendant, stop contacts 62, (which are normally biased to the closed position as shown in FIGURE 4), conductor 91, and fuse 69 to the left hand terminal of 110 volt source 66S.

Motor control relay 80 operates, and closes contacts 81 to complete a self-holding circuit which extends from source 66S over conductor 93', contacts 94–96, the winding of motor control relay 80, contacts 81, preset counter contacts 93, conductor 97, stop contacts 62, conductor 91, and fuse 69 to source 66S. Motor control relay 80, at its contacts 92–84, further completes an energizing circuit from the line conductors L1, L2, L3 to motor 16, and at its contacts 85 connects the signal output of the frequency generator 86 to the record head 105 to effect the recording of a signal on the portion of the wire 12 which is being wound over the magnetic recording device 19, the circuit extending from the right hand terminal of secondary winding 74S on transformer 74 over rectifier 101, conductor 102, contacts 100, conductor 104, contacts 85, conductor 103, record head 105, conductor 103', sensing relay 106, including resistor 107 connected in parallel therewith, to the center tap of the transformer winding 74S. During alternate half cycles, the circuit for current flow extends from the left hand terminal of winding 74S over diode 108 and over the described circuit including the recording head 105 to the center tap on secondary winding 74S. During the period that current flow occurs in such path for record head 105, sensing relay 106 operates, and at its contacts 76, 77 connects the record indicating lamp 78 on the frequency generator 86 over conductors 70, 71, to the 110 volt source 66S to indicate to the attendant that a signal is being recorded on the portion of the wire which is passing over record head 105.

As the motor 16 operates to drive the windup reel 14, and the wire 12 moves over the preset counter pulley 59, the preset counter 18 automatically measures the length of wire which passes thereover, and as the predetermined length preset in the counter by the first selection knob is measured, contacts 100 in the preset counter 18 are opened to interrupt the energizing circuit for record head 105. As a result, the portion of the wire following the predetermined length moves over the record head 105 without receiving a signal therefrom.

The motor 16 continues to drive the windup reel 14 and as the preset counter 18 advances to the second predetermined count registered in the counter by the second selection knob, contacts 93 are opened to interrupt the holding circuit for the motor control relay 80. As motor control relay 80 restores, it is effective at its contacts 82–84 to interrupt the energizing circuit for motor 16, at its contacts 81 opens its self-holding circuit, and at its contact 85 further interrupts the energizing circuit for record head 105. Motor 16 stops, and rotation of the winding reel is thus automatically terminated as a predetermined total length of wire has been wound on the windup reel 14. The attendant now removes the loaded reel 14 and places a new reel on the winding machine to receive the wire end. The preset counter 18 is reset, the two selection knobs adjusted to select the recorded length desired, and the total length of wire 12 to be placed on the reel 14, and the start button 61 is once more momentarily energized to initiate a further winding operation.

It will be apparent that during the period of operation of the motor 16, the attendant may stop the winding operation at any time by momentarily depressing the stop push-button to open contacts 62, and thereby interrupt the holding circuit for the motor control relay 80 to stop motor 16.

It will, of course, be apparent to parties skilled in the art that various combinations of contacts may be used in the preset counter 18 to correspondingly vary the nature and type of signals applied to the wire in its passage thereover. Thus one set of contacts, such as 100, may be preset to effect a momentary signal on the wire as each increment of wire of a selected length passes thereover. By using different code signals (pulse or frequency varied) to identify different increments, the length of wire on a given spool may be readily ascertained at any time, and inventory problems may be considerably simplified.

Also, as shown in more detail hereinafter, in some embodiments it may be preferable to provide a momentary signal a predetermined distance from the end of the wire rather than for the length extending substantially from the wire end to the point of signal recording cutoff as described above. In such arrangement a first set of normally open contacts would be connected to complete the circuit to the recording head 105 after a certain length has passed over the counter, and a second set of contacts would be set to interrupt the circuit at a second count which occurred shortly thereafter to thereby impress only a momentary signal on the wire. Alternatively, a single set of normally open contacts could be arranged to be only momentarily closed as the desired length was measured, and again only a momentary signal would be impressed on the wire at a predetermined distance from the wire end. The usefulness of such type of signal will be discussed in more detail hereinafter.

In one operative embodiment of the type shown in FIGURE 1 in which the signal was recorded on the wire for a predetermined length of the lead end of the wire as it was wound on the windup reel, a motor 16 drove the windup reel, such as 14, to wind a .012 hose wire at a speed of 1000 feet per minute. During the period in which the signal was placed on the wire, record light 78 illuminated to indicate to the attendant that signal recording was being effected. As the predetermined length of wire passed over the preset counter 18, contacts 100 opened to terminate the recording of the signal on the wire 12. As the desired length of wire was wound upon the windup reel 14, contacts 93 operated to interrupt the drive of the windup reel 14.

In such embodiment the record head 105 utilized a commercial transformer C core, and with completion of the circuit to head 105, the signal current passed through the record head winding to provide a magnetic field at the pole tips of the core. The record head was mounted as far as ¼ inch from the wire 12 and still effected recording of an adequate signal on the wire.

The preset counter 18 comprised a double predetermining counter Model U280/Z which is commercially obtainable from the Presin Company, Inc., Bridgeport, Conn. As a suitable alternative, two single predetermined counters of a well known commercially available type, could also be used by connecting the shafts thereof together, and connecting the reset mechanisms thereof in circuit.

Specific description of reader circuit

As noted above, the windup reels, such as 14, which have wires, such as 12, wound thereon with signal markings on the inner ends thereof may now be utilized with a beamer machine, such as shown in FIGURE 3. In the embodiment in FIGURE 3, four separate pay-off reels of such wire, identified as reels 35 in FIGURE 3, are fed through a gathering device 38 and over a magnetic sensing head 39 and traversing head 41 to take-off reel 45, which is driven by a winding apparatus 47. As will now be shown, when a magnetically-recorded portion of any one of the wires, such as 36, on any one of the payoff rolls, such as 35, traverses the magnetic sensing element 39, the rotation of the take-off reel 45 by winding apparatus 47 is automatically terminated, and a new pay-off reel, such as the reel 14 (FIGURE 1) may have its leading end connected to the trailing end of the nearly exhausted reel 35. After such connection is made, the operation may again be continued by depressing an associated reset button on the control apparatus for reader circuit 50, and momentarily energizing a start button on the control circuit for winding apparatus 47.

With reference now to FIGURE 5, the specific manner in which magnetic sensing head 39 and reader circuitry 50 are operative to control the cicuitry for winding apparatus 47 to effect such manner of operation is now set forth in more detail. As there shown, winding apparatus 47 includes a motor 114 connected to drive the take-off reel 45 for the beam strand in the beamer unit (FIGURE 3) and a motor starter circuit 113 which is controlled from push-button station 110 to in turn control connection of the motor 114 to line conductors L1, L2 and L3 of a conventional 220 volt alternating current three-phase source 75.

More specifically, push-button stage 110 includes a start button for closing a pair of associated contacts 111 to thereby complete a 220 volt alternating current circuit for a motor control relay 116 in motor starter circuit 113, which circuit extends from conductor L1 over motor overload contacts OL1, OL2, OL3, motor control relay 116, conductor 121, start contacts 111, stop contacts 112, and conductor 122 to line conductor L3. Motor control relay 116 operates, and at its contacts 117, 118, 119 connects line conductors L1, L2, L3 to motor 114 to effect the energization thereof, and at its contacts 120 completes a self-holding circuit (which is independent of the momentarily closed start button contacts 111) the holding circuit extending from line conductor L1, over contacts OL1, OL2, OL3, motor control relay 116, conductors 121, 49, contacts 198 (which as shown hereinafter, are effective to interrupt the circuit and operation of the motor 114 whenever a signal is detected on the wire 12 by reader 50), conductor 48, self-holding contacts 120, and stop button contacts 112 to line conductor L3. It will be apparent that since the circuit for the motor control relay 116 extends over the stop button contacts 112, the attendant may stop operation of the winding apparatus at any time by momentarily depressing the stop button to open contacts 112, whereby motor relay 116 will restore to stop motor 114.

In a similar manner, reader 50 is effective at its contacts 198 whenever a signal is detected on the wire 12 by magnetic sensing head 39 to interrupt the holding circuit for the motor control relay 116, and thereby stop the motor. Such manner of operation will not be set forth in detail.

Power for the reader circuit 50 is supplied by a power source 124 which is operative to provide a regulated ten volt output to the reader negative and positive supply conductors 147, 148. In the arrangement shown in FIGURE 5, the power supply includes a plug 126 for connecting the power supply 124 to a conventional 110 volt, 60 cycle source, and further includes a single pole single throw control switch 127 for connecting power over fuse 130 to the primary winding 128P of a power supply transformer 128. Transformer secondary winding 128S is connected to the two opposed input terminals of a conventional full-wave diode bridge 132. Output terminals 137, 138 in bridge 132 provide rectified full wave power for a regulator network including resistor 140, adjustable resistor 141 and a Zener diode 142 which are connected in series across output terminals 137, 138 and a filter capacitor 139 connected across the output terminals 137, 138 in parallel with the series circuit.

Power for the reader circuit 50 is derived across Zener diode 142 by a pair of supply conductors 147, 148. The Zener diode 142, which provides a constant ten volt source for the reader circuit 50, is primarily utilized to insure a constant voltage during the period that self-latching relay 192 in reader cicuit 50 is energized. In use, the output of the power supply 124 is adjusted by movement of resistor 141 so that with the input to the magnetic sensing head 39 shorted, the total current supply to the Zener diode 142 is in the order of approximately 200 ma. D.C.

Reader circuit 50 basically comprises a magnetic sensing head 39, a three-stage amplifier 160, an emitter-follower stage 175, a power transistor 185, a switching stage 190, a signal detected lamp 207, and a control relay 205 which at its contacts 198 control de-energization of the motor 16 whenever a signal is detected by magnetic sensing head 39.

More specifically, magnetic sensor head 39 includes a read head 149 having one terminal thereof connected to a positive supply conductor 148 and the opposite terminal thereof connected over conductor 150 and capacitor 152 to the base input of transistor 153 in the first stage of amplifier 160. In one operative embodiment, the read head 149 was formed using an H425, 4 mil "C" core having 560 turns of No. 33 HN magnet wire, random wound. For the purpose of facilitating mounting of the head, the read head was encapsulated in a suitable can housing identified in the art as a MIL-T-27A-AG, which is of a non-magnetic material. Record head 105 (FIGURE 4) was contained in a similar type housing.

Amplifier stage 160 is a three-stage device each of which stages includes a conventional grounded-emitter, linear transistor amplifier 153, 165, 170 with the exception of the third stage which is connected Class B.

With reference to the first stage, it will be apparent that the emitter element of transistor 153 is connected over resistance 161 and capacitor 162 to the positive supply bus 148; the base element in addition to its connection over capacitor 152 to the output of the read head 149 is connected to a voltage divider, comprised of resistors 156 and 157. One end of voltage divider 156, 157 is connected over resistor 155 to negative ten volt conductor 147 and over capacitor 158 to ground. The other end of voltage dividers 156, 157, is connected to the positive supply conductor 148. The collector of amplifier 153 is connected over potentiometer 159 and over resistor 155 to the negative ten volt supply conductor 147. Resistance 159 is adjustable so that the output gain of the first stage (and therefore the amplifier 160) may be varied in use of the unit with different types of wires and with the head 39 mounted at different spacings from the wire.

In the use of the device to detect signals on a wire 12 of high carbon steel, the potentiometer 159 is set at about a quarter of a turn to provide gain sufficient to energize the latching relay 192 when the wire to head distance is about 3/16 of an inch. Because of the lower signal level obtained with magnetic stainless steel wire, potentiometer 159 is set at about 3/4 to full position to actuate the latching relay 192 under the same operating conditions. With the provision of the adjustable gain control 159 the reader circuit 50 may thus be used to provide reliable readout with different head to wire distances, and also with different types of magnetic wire.

The adjustable arm of resistor 159 is connected over capacitor 163 to the base of transistor 165 in the second amplifier stage. A voltage divider comprised of resistances 164, 166 is connected at one end over resistor 168 to the negative ten volt supply conductor 147, and at the other end is connected to the positive supply conductor 148. The junction of resistors 168 and 164 is connected over filter capacitor 167 to ground. The emitter of transistor 165 is connected over RC network including resistance 169, capacitor 170' to the positive supply bus 148. The collector of transistor 165 is also connected over resistor 171 to the junction of resistor 164, 168 and also over capacitor 172 to the base of transistor 170 in the third amplifier stage.

The base of transistor 170 is connected over resistor 174 to the negative ten volt supply bus 147 and over capacitor 173 to ground. The emitter 175 of transistor 170 is connected over resistor 176 to negative supply bus 147, and the collector of transistor 170 is connected over resistor 175 to the positive supply bus 148. Transistor 170 is biased to operate Class B.

Transistor 177 which is connected as an emitter follower has its collector connected over resistor 178 to the negative ten volt supply bus 147, and also over capacitor 179 to ground. The emitter of transistor 177 is connected over resistance 180 to positive supply bus 148, and over half-wave rectifier 181 and resistor 184 to the base of power transistor 185. A filter network including resistor 182 and capacitor 183 are connected between the anode of the rectifier 181 and the positive power supply 148. The emitter of power transistor 185 is connected over diode 186 to the positive supply conductor 148 and the collector of power transistor 185 is connected over a parallel circuit in the switching stage 190 including self-latching relay 192 and diode 191, to the negative ten volt supply conductor bus 147.

In the absence of a signal on the wire 12, there will be no effective signal detection by the read head 149, and the signal output of the amplifier stage 160 and emitter follower stage 175 will be a positive signal which turns the power transistor 185 off. Relay 192 will be de-energized and contacts 194, 197 will be open. With the detection of a signal on the wire by the read head 149, the signal is amplified by the three-stage amplifier 160, and a negative signal is coupled over emitter follower stage 175 and rectifier 181 to the base of the power transistor 185 to switch the transistor 185 on. With conduction by transistor 185, a circuit is completed for the self-latching relay 192 which extends from the negative supply bus 147 over relay 192, transistor 185 and diode 186 to the positive supply bus 148.

Self-latching relay 190 operates and at its contacts 197 completes a self-holding circuit, which extends from ground over contacts 197, normally closed reset button 200, resistor 199 and the parallel circuit including rectifier 191 and the winding of relay 192 to the negative supply bus 147. Simultaneously, relay 190 closes its contacts 194 to complete an energizing circuit for control relay 205 which extends from the upper conductor of the 115 volt, 60 cycle supply source over a single-pole, single-throw switch 127, fuse 130, conductor 209, the winding of control relay 205, closed contacts of on-off switch 206, contacts 194, and conductor 208 to the second side of the 115 volt, 60 cycle alternating current supply source. An obvious circuit is simultaneously completed for the signal detected lamp 207 in parallel with control relay 205 to indicate to the attendant that the control relay 205 is energized.

Control relay 205 operates and at its contacts 198 interrupts the energizing circuit for the motor control relay 116 which restores, and at its contacts 117–119 interrupts the energizing circuit for the motor 114 to thereby terminate operation of motor 114 and its drive of the take-off reel 45.

The leading end of a new pay-off coil may now be connected to the trailing end of the nearly exhausted reel which has been detected by the readout circuit 50. Thereafter the normally closed reset button 200 is opened to interrupt the holding circuit for the self-latching relay 192, after which the start button in the motor starter circuit 113 is momentarily energized to momentarily close contacts 111, and thereby initiate drive of the take-off reel 45 by motor 114 in the manner described.

If the recorded signal on the wire on the nearly exhausted reel has not completely passed over the magnetic sensing head 39, when the reset button 200 is operated, the signal will result in interruption of the energizing circuit for the motor. It will be necessary in such event for the operator to maintain the "start" button in push button station 110 depressed to close contacts 111 until such time as the recorded signal on the trailing end of the wire from the exhausted reel passes the magnetic sensing head 39. When no further signal is detected, the reset button 200 is reset, the start button is depressed, and the motor 116 drives the reel 45 in the manner described.

In one modification of the disclosed embodiment, operation of the start button by the attendant for the period required to move the wire 12 past the magnetic sensing head 39 can be eliminated by utilizing a modified type of signal on the wire 12 itself. That is, in such arrangement, a normally open set of contacts in the preset counter 18 is connected to close a circuit to a time delay relay (not shown) after a given length of wire has been measured and the relay operates for a momentary period (as determined by its operating characteristics) to connect the magnetic recording device 19 to the output of frequency generator 86 for only a fraction of a second. Such contacts would be normally open, and would be connected in the circuit in lieu of illustrated contacts 100 (FIG. 4).

In such arrangement only a momentary signal will appear on the wire, and in use of the reels with a machine such as shown in FIGURE 3, the normal movement of the wire 12 is the beamer operation will be such that the signal on the wire 12 will be moved past the magnetic sensing head 149 when the beamer stops. As a result, when the splice is made, the operator need merely operate the reset button 200, and momentarily depress the "start" button in push button station 110 to effect further operation of the equipment.

To further facilitate operation of the device, the contacts on the reset button 200 in the reader 50 could be added to the motor starter circuit 65 in such manner that operation of the start button to close contacts 111 would also open reset contacts 200. In this manner the operation of the device by the operator subsequent to the splicing operation would be limited to the operation of a single push-button.

In yet another embodiment the position of the recorded signal is determined by setting the preset counter 18 so that the signal will be located on the wire 12 at least far enough from the end of the wire to permit a slow stop by the fastest beamer. In installations in which beamers are operative at particularly high speeds, control relay 205 in the reader 50 is replaced by a time delay relay, and a normally closed contact on the relay opens an adjustable period after the relay coil is energized. With such arrangement, the beamer operator may adjust the time of operation of the relay after detection of the signal in such manner that the end of the wire will always be in just the right position for joining to the wire in the new spool as the motor 47 is deenergized, and take-off reel 45 comes to rest.

It will be understood that various modifications and rearrangements may be made therein for disclosing my invention without departing from the spirit and scope of my invention.

I claim:

1. A method for use in the industrial art of magnetizable wire the steps comprising effecting movement of magnetizable wire from a supply thereof to a wind-up coil, measuring a predetermined lengthwise portion at the leading end of said wire in its movement from said supply in winding of the same into said wind-up coil, magnetically impressing a signal on said predetermined lengthwise portion of said wire in its movement from said supply to said wind-up coil, effecting movement of said wire from said wind-up coil to a take-off coil, magnetically sensing said signal on said predetermined lengthwise portion of said wire in its movement from said wind-up coil to said take-off coil to terminate movement of said wire toward said take-off coil, and again effecting movement of said wire from said wind-up coil to said take-off coil and erasing said signal on said predetermined portion of said wire prior to winding of the same into said take-off coil.

2. A method for use in the industrial art of magnetizable wire the steps comprising effecting movement of a magnetizable wire from each of a plurality of first pay-off coils in which said wires each have a magnetic signal inpressed on predetermined lengthwise portions at the inner ends of said wires of said pay-off colis to a take-off coil by rotating the latter, magnetically sensing for said signal on said predetermined lengthwise portions of said wires of said first pay-off coils in the movement of said wires toward and in advance of said take-off coil, and connecting the leading end of a second pay-off coil of magnetizable wire conforming to said first pay-off coils to the inner end of a coil of said plurality of first coils the magnetic signal on the predetermined portion of which has been sensed.

3. A method for use in the industrial art of magnetizable wire the steps comprising effecting movement of a magnetizable wire from each of a plurality of first pay-off coils in which said wires each have a magnetic signal impressed on predetermined lengthwise portions at the inner ends of said wires of said pay-off coils to a take-off coil by rotating the latter, magnetically sensing for said signal on said predetermined lengthwise portions of said wires of said first pay-off coils in the movement of said wires toward and in advance of said take-off coil, terminating rotation of said take-off coil upon sensing said magnetic signal on said predetermined lengthwise portion of any of said pay-off coils, connecting the leading end of a second pay-off coil of magnetizable wire conforming to said first pay-off coils to the inner end of a coil of said plurality of first coils the magnetic signal on the predetermined portion of which as been sensed, and again effecting rotation of said take-off coil.

4. In an apparatus of the class described the combination of a rotatable supply reel for supporting a coil of magnetizable wire, a rotatable wind-up reel having the leading terminal end portion of the wire of said supply coil wound thereon, means for rotating said wind-up reel to draw the wire from said supply reel onto said wind-up reel to coil the wire on the latter, means for measuring a predetermined lengthwise portion of said wire following said leading terminal end portion thereof, magnetic recording means for applying a magnetic signal to said predetermined length-wise portion of said wire, and means for detecting for the presence of said magnetic signal before winding of said predetermined lengthwise portion of said wire onto said wind-up reel.

5. In an apparatus of the class described the combination of a plurality of pay-off reels each supporting a pay-off coil of magnetizable wire having a magnetic signal impressed on a predetermined lengthwise portion of the inner terminal end of a pay-off coil, a single rotatable take-off reel having the leading terminal end portions of the wires of said pay-off coils wound thereon, drive means for rotating said take-off reel to draw the wires of said pay-off coils onto said take-off reel to form a take-off coil, and magnetic sensing means connected with said drive means and responsive to the magnetic signal on said predetermined lengthwise portions of said wires of said pay-off coils to de-energize said drive means before drawing off the inner terminal ends of said pay-off coils from said pay-off reels.

6. In an apparatus of the class described the combination of a plurality of pay-off reels each supporting a pay-off coil of magnetizable wire having a magnetic signal impressed on a predetermined lengthwise portion of the inner terminal end of a pay-off coil, a single rotatable take-off reel having the leading terminal end portions of the wires of said pay-off coils wound thereon, drive means for rotating said take-off reel to draw the wires of said pay-off coils onto said take-off reel to form a take-off coil, magnetic sensing means connected with said drive means and responsive to the magnetic signal on said predetermined lengthwise portions of said wires of said pay-off coils to de-energize said drive means before drawing off the inner terminal ends of said pay-off coils from said pay-off reels, and means between said magnetic sensing means and said take-off reel for removing the magnetic signals on said predetermined lengthwise portions of said wires of said pay-off coils.

7. A method for use in the industrial art of magnetizable wire the steps comprising, effecting movement of magnetizable wire from a supply thereof into a wind-up coil, measuring a leading portion of said wire to provide a predetermined number of inner turns for said wind-up coil and magnetically impressing a signal on at least a portion thereon, uncoiling said wire from said wind-up coil, sensing for the magnetic signal impressed on said wire while uncoiling said wire from said wind-up coil, and terminating uncoiling of said wire from said wind-up coil upon sensing said magnetic signal and before said inner turns are completely uncoiled from said wind-up coil.

8. A method for use in the industrial art of magnetizable wire in which a plurality of magnetizable wires are each formed into a wind-up coil, and in which each of the magnetizable wires of each wind-up coil has a magnetic signal impressed on at least a portion thereon at a predetermined inner portion to provide a predetermined number of inner turns for said wind-up coil, the steps comprising simultaneously uncoiling all of said wires from said wind-up coils, sensing for the magnetic signals impressed on said wires while uncoiling said wind-up coils, and terminating uncoiling of all of said wind-up coils upon sensing the magnetic signal on any one of said wires and before said inner turns of said any one of said wires is completely uncoiled from its wind-up coil.

References Cited
UNITED STATES PATENTS

| | | | |
|---|---|---|---|
| 2,558,249 | 6/1951 | Hewlett et al. | 340—174.1 |
| 2,989,690 | 6/1961 | Cook | 340—174.1 |
| 3,109,898 | 11/1963 | Gray | 179—100.2 |
| 2,514,578 | 7/1950 | Heller et al. | 242—57 |
| 3,069,570 | 12/1962 | Abadie | 242—57 |

FOREIGN PATENTS 1,377,001   12/1963   France.

BERNARD KONICK, *Primary Examiner.*

VINCENT P. CANNEY, *Assistant Examiner.*

U.S. Cl. X.R.

179—100.2; 242—36, 57